US008774520B2

(12) United States Patent
Ofek et al.

(10) Patent No.: US 8,774,520 B2
(45) Date of Patent: *Jul. 8, 2014

(54) GEO-RELEVANCE FOR IMAGES

(71) Applicant: Microsoft Corporation, Redmond, WA (US)

(72) Inventors: Eyal Ofek, Redmond, WA (US); Boris Epshtein, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,659

(22) Filed: Oct. 30, 2012

(65) Prior Publication Data

US 2013/0051623 A1    Feb. 28, 2013

Related U.S. Application Data

(63) Continuation of application No. 11/867,053, filed on Oct. 4, 2007, now Pat. No. 8,326,048.

(51) Int. Cl.
    *G06K 9/00*    (2006.01)
(52) U.S. Cl.
    USPC .......................................... 382/190; 382/224
(58) Field of Classification Search
    USPC ................................................... 382/190, 224
    See application file for complete search history.

(56) References Cited

U.S. PATENT DOCUMENTS

| 5,696,684 | A | 12/1997 | Ueberschaer |
| 6,885,939 | B2 | 4/2005 | Schmidt et al. |
| 7,042,470 | B2 | 5/2006 | Rhoads et al. |
| 7,142,709 | B2 * | 11/2006 | Girard ........................... 382/154 |
| 7,565,014 | B2 * | 7/2009 | Martin et al. .................. 382/190 |
| 8,326,048 | B2 * | 12/2012 | Ofek et al. ..................... 382/224 |
| 2002/0030693 | A1 * | 3/2002 | Baldwin ....................... 345/620 |
| 2004/0167670 | A1 * | 8/2004 | Goncalves et al. ........... 700/259 |
| 2005/0027712 | A1 | 2/2005 | Gargi et al. |
| 2005/0207650 | A1 * | 9/2005 | Martin et al. .................. 382/190 |
| 2005/0285876 | A1 | 12/2005 | Balaga et al. |
| 2006/0037990 | A1 | 2/2006 | eise |
| 2006/0093223 | A1 | 5/2006 | Portigal et al. |
| 2007/0024612 | A1 * | 2/2007 | Balfour ......................... 345/419 |

FOREIGN PATENT DOCUMENTS

| WO | WO9304437 A1 | 3/1993 |
| WO | WO0198925 A2 | 12/2001 |
| WO | WO03093954 A2 | 11/2003 |

OTHER PUBLICATIONS

Snavely et al., "Photo Tourism: Exploring Photo Collections in 3D", Computer Science & Engineering, University of Washington, p. 12.
Girgensohn et al., "Simplifying the Management of Large Photo Collections", 2003, IOS Press, pp. 196-203.
Ravichandran, "Clustering Photos to Improve Visualization of Collections", 2007, Rheinisch-Westfalischen Technischen Hochschule, pp. 1-90.

\* cited by examiner

*Primary Examiner* — John Strege
(74) *Attorney, Agent, or Firm* — Steven Spellman; Jim Ross; Micky Minhas

(57) ABSTRACT

Images may be sorted and categorized by defining a frustum for each image and overlaying the frustums in two, three, or four dimensions to create a density map and identify points of interest. Images that contain a point of interest may be grouped, sorted, and categorized to determine representative images of the point. By including many images from different sources, common points of interest may be defined. Points of interest may be defined in two or three Euclidian dimensions, or may include a dimension of time.

20 Claims, 5 Drawing Sheets

GEO-RELEVANCE FOR IMAGES

CROSS-REFERENCE TO RELATED APPLICATION(S)

This application is a continuation application of U.S. application Ser. No. 11/867,053, filed on Oct. 4, 2007, the disclosure of which is incorporated herein by reference in its entirety.

BACKGROUND

Organizing and sorting images is a very difficult task. Many websites enable users to post their own photographs or images and often allow them to tag the images with a description or other metadata. However, the tags are often very general and difficult to search or further categorize. Many users do not take the time to adequately categorize their images, and each user may be inconsistent with their categorization. Because each user may categorize their images in a different manner from other users, grouping and organizing large quantities of images can be impossible.

When all the sources of images is combined, the volume of images that may contain the same content, such as an iconic landmark like the Eiffel Tower, can be staggering. When all of the images are available electronically, sorting and categorizing the images to identify important landmarks and select a representative image for each landmark can be very difficult.

SUMMARY

Images may be sorted and categorized by defining a frustum for each image and overlaying the frustums in two, three, or more dimensions to create a density map and identify points of interest. Images that contain a point of interest may be grouped, sorted, and categorized to determine representative images of the point of interest. By including many images from different sources, common points of interest may be defined. Points of interest may be defined in two or three Euclidian dimensions, or may include a dimension of time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
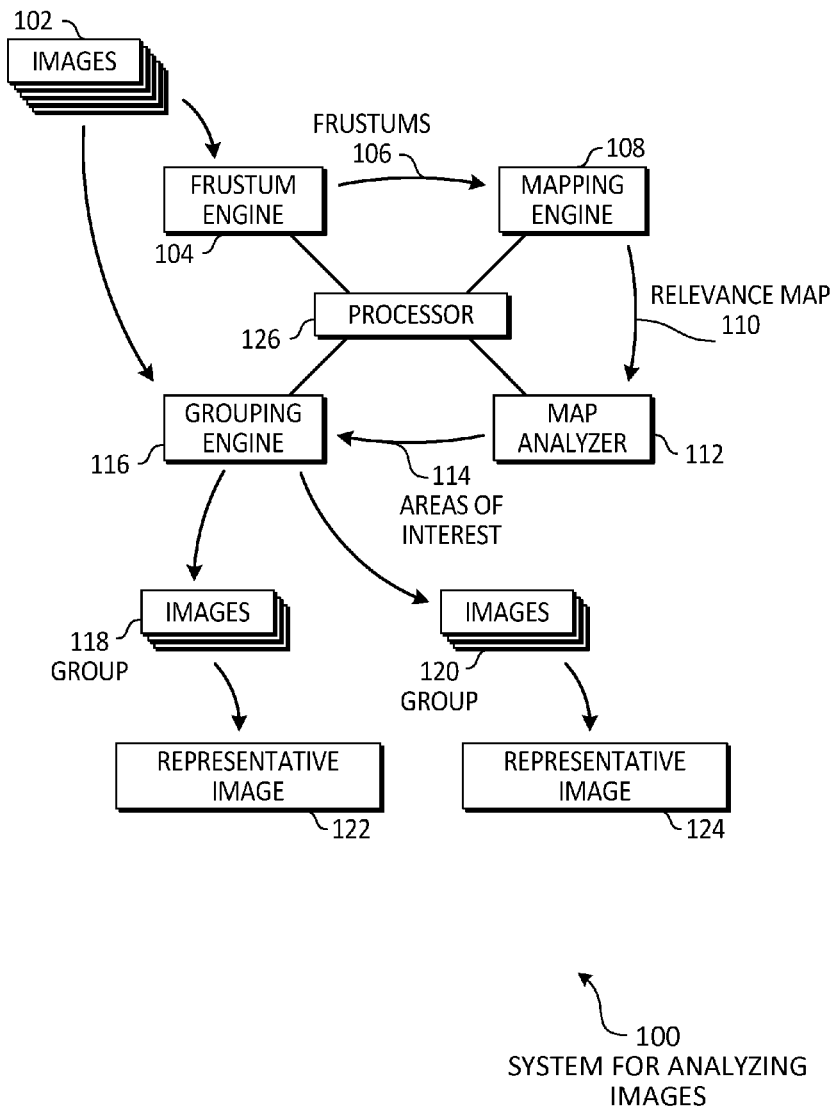
FIG. 1 is a diagram illustration of an embodiment showing a system for analyzing images.

Large numbers of images may be grouped together based on overlapping image frustums to identify areas of interest. From those areas of interest, representative images may be selected. The areas of interest and representative images may be determined merely from the aggregation and analysis of many images in an automated fashion, without a human to intervene and group, classify, or select images.

Each image taken from a camera can be represented by a frustum having a point of origin, direction, viewing angle, and depth. Components of a frustum definition may be determined precisely using geopositional devices such as a GPS receiver, or may be approximately determined by a user selecting an approximate position from where an image was taken and the approximate direction. Other techniques may also be employed, including stitching images together by mapping one portion of a first image with a portion of a second image.

When the frustums of many images are overlaid on a map, areas of high and low frustum density may emerge. In many cases, important buildings, situations, locations, people, or other items may be captured by images from many different photographers or by many different images. By examining a large quantity of images, high density areas may indicate an important item that has been captured.

Once an area of interest is determined from the density of overlapping frustums, those images that include the area of interest may be identified and grouped. In some cases, the group may be analyzed to determine subgroups.

Various analyses may be performed on the grouped images, such as finding an image that best covers the area of interest or that has the best sharpness, resolution, color distribution, focal length, or any other factor.

The frustums may have various weighting functions applied. In some cases, the weighting function may vary across the viewable area of the image. In other cases, some images may be weighted differently than others.

The analysis may take images from many different sources and automatically determine areas of interest. The areas of interest may be ranked based on the density of coverage and representative images selected. The process may be performed without any knowledge of the subject matter or the likely candidates for important features that may be within the images. From an otherwise unassociated group of photographs or images, the important images may be automatically determined by finding those features or items that are most commonly photographed.

In some embodiments, the analysis may be performed with the added dimension of time. Such analyses may be able to highlight a particular event or situation.

Some analyses may identify outlying or anomalous images that may have some importance. As a large number of images are analyzed for a geographic area, a general density pattern may emerge that additional images may generally follow. Images that are taken in areas that are much less dense may contain items that are 'off the beaten path' and may be also identified as areas of interest.

Throughout this specification and claims, the term 'image' is used interchangeably with 'photograph', 'picture', and other similar terms. In many of the methods and operations described in this specification, the 'image' may be an electronic version of an image, such as but not limited to JPEG, TIFF, BMP, PGF, RAW, PNG, GIF, HDP, XPM, or other file formats. Typically, an image is a two dimensional graphic representation that is captured using various types of cameras. In some cases, a camera may capture and create an electronic image directly. In other cases, an image may be captured using photographic film, transferred to paper, then scanned to become an electronic image.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for analyzing images. Embodiment 100 is an example of a system that may accept a set of images, determine frustums for each of the images that may be defined by an origin, direction, and field of view as defined in space. The frustums may be mapped onto the same two dimensional, three dimensional, or four dimensional space to form a relevance map. The map may show various densities of coverage by the images, and the densities may be used to determine areas of interest, which may be used to group the images together.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a mechanism that organizes and sorts images by classifying image content based on the volume or density of image coverage for a certain object, event, or other item. Areas that have the most image coverage may be identified as objects or areas of interest.

For example, when people visit Paris, there are several landmarks that are often photographed, such as the Eiffel Tower. If several visitors to Paris collected their photographs or images and were analyzed by embodiment 100, the Eiffel Tower would likely be one of the most photographed objects.

Images 102 are sorted by determining at least an approximate frustum that defines the image in space. A frustum is a truncated pyramid shape that may define the viewable area of a photograph or other image. The frustum engine 104 may define a frustum 106 through many different mechanisms.

In some embodiments, a camera may be outfitted with one or more devices that may capture metadata about an image. For example, a camera may capture a focal length, f-stop, view angle, lens size, zoom depth, shutter speed, or any other parameter about the image. Some cameras may be outfitted with global positioning system (GPS) receivers that may output a globally defined position and, in some cases, a direction for the image. Some cameras may also track the date and time of the image.

Much of this metadata may be used to reconstruct or partially reconstruct a frustum that defines an image. In some embodiments, a user may locate a position and direction for each image on a map. In other embodiments, automated algorithms may identify features in an image and attempt to 'stitch' or place the image in relationship to another image. From such algorithms, a two or three dimensional model may be constructed from several two dimensional images.

In some cases, a frustum may be defined only approximately and with little precision. For example, a user input may define an image as being taken from a particular street corner facing a general direction. As the volume of images increases, the density maps that may be created from the images may be less dependent on the precision of each frustum definition.

The various frustums 106 may be fed into a mapping engine 108 that is capable of generating a density or relevance map 110. The mapping engine 108 may effectively overlay the various frustums 106 in relation to each other.

As in the example above of visitors to Paris, the volume of images that are taken of the Eiffel Tower may be higher than other places around Paris. By overlaying a frustum for each image, a high density of frustums may relate to the position of the Eiffel Tower. In some embodiments, the analysis system of embodiment 100 may have no special knowledge of what portions of an image may be relevant or interesting, but can identify the areas merely based on the volume of images that point to or cover a specific geographic area. Using the system of embodiment 100 without any outside knowledge, those items that are more often photographed would be more densely covered and thus more relevant.

The map analyzer 112 may take the relevance map 110 and identify the areas of interest 114. In many cases, the areas of interest may generally be the areas that are most densely covered.

The relevance map 110 may be defined in several different ways. In a simple and easy to understand form, the relevance map 110 may be a two dimensional map on which a triangle representing each image may be overlaid. Each triangle may represent the physical area captured by an image.

The relevance map 110 may be defined in three dimensions, which may include X, Y, and Z axes. In such a case, each image may be defined by a pyramidal frustum. In a simplified embodiment, an image may be represented as a ray having an origin and direction. For the purposes of this application and claims, the term 'frustum' shall include a three dimensional pyramidal frustum as well as a triangle, truncated triangle, parallelogram, ray, vector, or other representation of the coverage area or volume of an image.

In another embodiment, the relevance map 110 may be defined with a time axis. By analyzing the relevance map 110 with respect to time, specific events may be located from the images.

For example, several photographers may take pictures during a wedding reception. During certain events during the wedding reception, such as cutting the cake or a first dance, many of the photographs may be taken. At other times, the number of images may be much fewer. By looking at the density of images taken over time, an event can be identified. The relative importance of the event may be determined by the density of images captured at that time.

The map analyzer 112 may identify areas of interest 114 using many different mechanisms. In some embodiments, the distribution of values across a relevance map 110 may be analyzed to determine areas or points of high values and low values. In some cases, an area of interest may be defined as a single point. In other cases, an area of interest may be defined as a defined area or volume.

An area of interest may be identified as an area or point that is captured by many images. When many different images are analyzed, especially when the images come from many different sources, there may be certain items that are photographed more often than others. Such items may be the icons, highlights, tourist destinations, or other important features, such as the Eiffel Tower in the example of Paris given above.

A grouping engine 116 may create image groups 118 and 120 based on the areas of interest 114. The grouping engine 116 may take an area of interest 114 as defined by a point or area, and identify those images whose frustums overlap at least a portion of the area of interest. In some cases, an image frustum may cover only a small portion of the area of interest.

After the images are grouped, a representative image 122 and 124 may be selected from the groups 118 and 120, respectively. A representative image may be automatically determined using several criteria. One criterion may be to select an image that has a frustum that captures most of the area of interest and where the area of interest fills the frustum. Using the Eiffel Tower example, such a criterion may prefer images in which the Eiffel Tower is centered in the image and fully fills the image, and may exclude images where the Eiffel Tower is off to one side or is a much smaller portion of the image.

Other criteria may be additionally considered to select a representative image, including the sharpness of the image, resolution, contrast, or other criteria. Some embodiments may perform additional analysis to ensure that the object of interest is included in the representative image 118 or 120. In some cases, the additional analysis may involve human operators to select a single representative image from a group of prospective images, or automated tools may be used to analyze the images to determine if the object of interest is actually portrayed in the representative image.

The grouping engine 116 may form groups of images that contain specific areas of interest, and may leave many images unclassified. In some cases, the grouping engine 116 may create a hierarchical tree of classification. Such a tree may be formed by creating a first group of images, then analyzing the group of images to identify second-level areas of interest within the group, and creating sub-groups based on the second-level areas of interest. In many embodiments, a vast number of images may be processed in a recursive manner to generate a deep, multilevel hierarchical tree of areas of interest.

The embodiment 100 may be a computer application that operates on a processor 126. In some cases, the various functions of the frustum engine 104, mapping engine 108, map analyzer 112, and grouping engine 116 may be software, hardware, or combination of software and hardware components that are capable of performing the functions described for the respective items. In some embodiments, one or more of the frustum engine 104, mapping engine 108, map analyzer 112, and grouping engine 116 may be performed by separate devices and may be performed at different times.

For example, many functions of the frustum engine 104 may be incorporated into a camera, where a GPS receiver may determine a frustum origin and direction and a field of view and focal length may be determined from lens settings for the camera.

In other cases, the frustum engine 104 may be performed by two or more systems, such as when a user uploads an image to a website and uses a map on the website to input the origin and direction of the image. A second system may process the information to calculate an approximate frustum for the image.

Some embodiments may use a high powered processor, server, cluster, super computer, or other device to perform the functions of a mapping engine 108 and map analyzer 112. The functions of the mapping engine 108 and map analyzer 112 may involve processing vast amounts of data and performing many computations. In some cases, thousands or even millions of images may be processed to determine areas of interest, especially when a detailed and deep multilevel hierarchical analysis is performed.

In some cases, a new image may be analyzed using embodiment 100 after a large number of images have been processed and a relevance map 110 already exists. In such an analysis, a new image may be compared to an existing relevance map 110 and areas of interest 114 by the grouping engine 116 so that the new image may be classified.

As the number of images that are processed increases, the areas of interest 114 may become stable enough that additional images may not change the areas of interest 114 significantly. In some cases, groups of tens, hundreds, or thousands of images may be analyzed to determine areas of interest 114, from which many other images may be classified and grouped. In other cases, hundreds of thousands or even millions of images may be processed to produce a deep hierarchical tree of areas of interest. Once such a tree is defined, new images may be quickly classified into various groups by the grouping engine 116.

Figure 2:
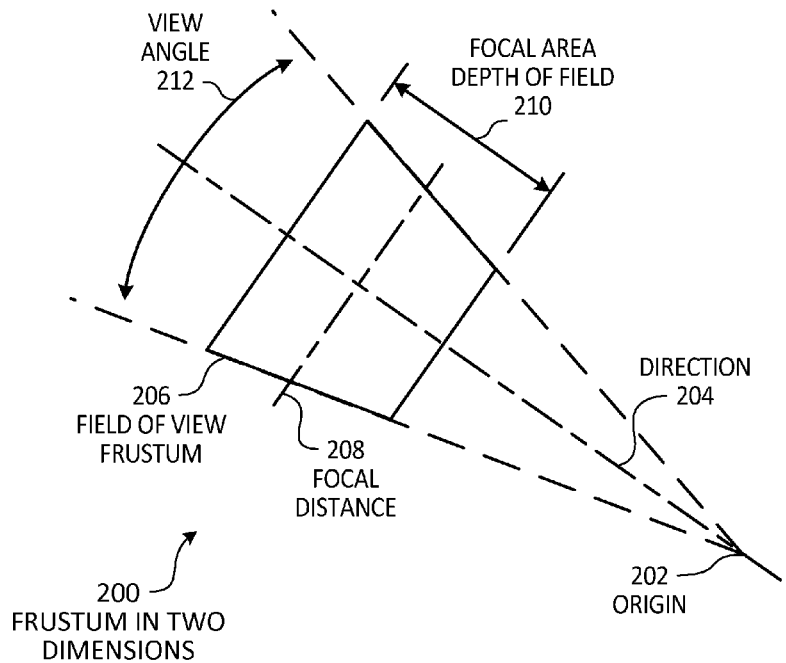
FIG. 2 is a diagram illustration of an embodiment showing a frustum in two dimensions.

FIG. 2 is a diagram representation of an embodiment 200 showing a two dimensional representation of a frustum. In two dimensions, a frustum becomes a parallelogram.

The frustum 200 has an origin 202 and direction 204. The field of view 206 may be centered about the focal distance 208 and may be defined by a depth of field 210. In some cases, the frustum 200 may be determined using a view angle 212 or other lens parameters.

The frustum 200 may be an approximation of the physical area that may be captured by an image. The physical area may be the approximate area that would be in focus based on the various parameters of the specific camera that captured the image or of a general camera. In some cases, a camera may be able to capture some image-specific metadata such as focal length, f-number or focal ratio, aperture, view angle, or other parameters. In other cases, an image may be approximated by assuming a standard view angle, focal length, or other parameters when some parameters are not specifically available.

The origin 202 may be the approximate position of a camera when an image is captured, and the direction 204 may be centerline of the lens of the camera. The view angle 212 may be defined by the focal length of the lens. The depth of field 210 may be defined by the lens aperture.

In many cases, a focal distance may be infinity, which may be common for outdoor pictures. If this were literally interpreted, the frustum may be infinitely deep. In practice, each image has an object that defines the furthest point that the frustum actually captures, and the frustum edge furthest from the origin may follow a contour of the objects in the image.

In some embodiments, the far edge of the frustum may be mapped to a two dimensional or three dimensional representation of the physical location near the place where a picture was taken. For example, if a photographer were standing on a street corner in Paris taking a picture across a neighborhood but pointed in the direction of the Eiffel Tower, the image may have tall buildings as a backdrop and may not include the Eiffel Tower at all. If a frustum were created to represent the image, the far edge of the frustum may be mapped to a representation of the buildings in the neighborhood and thus the frustum may be truncated so that it does not include the area of the Eiffel Tower.

The frustum 200 is a two dimensional representation of an image. In many embodiments, a two dimensional approximation of each image may be sufficient to determine areas of interest and classify images.

Figure 3:
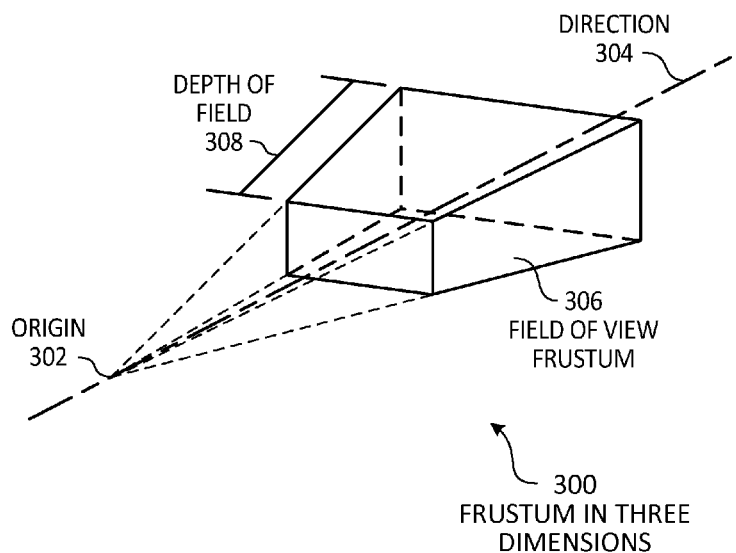
FIG. 3 is a diagram illustration of an embodiment showing a frustum in three dimensions.

FIG. 3 is a diagram representation of an embodiment 300 showing a three dimensional representation of a frustum. In three dimensions, the frustum 300 may be a pyramidal frustum.

The frustum 300 may have an origin point 302 and direction vector 304, and the depth of field 308 may define the field of view frustum 306.

The frustum 300 may be defined using the same parameters as discussed for the two-dimensional frustum illustrated in FIG. 2. The frustum 300 illustrates a three dimensional volume that may capture the items in focus for a particular image.

In some embodiments, a three dimensional representation of each image may be used to determine points, areas, or volumes of interest. The additional complexity of determining a vertical component for the direction vector 304 may be difficult to assess in some embodiments, but may add a more accurate identification of areas of interest.

Figure 4:
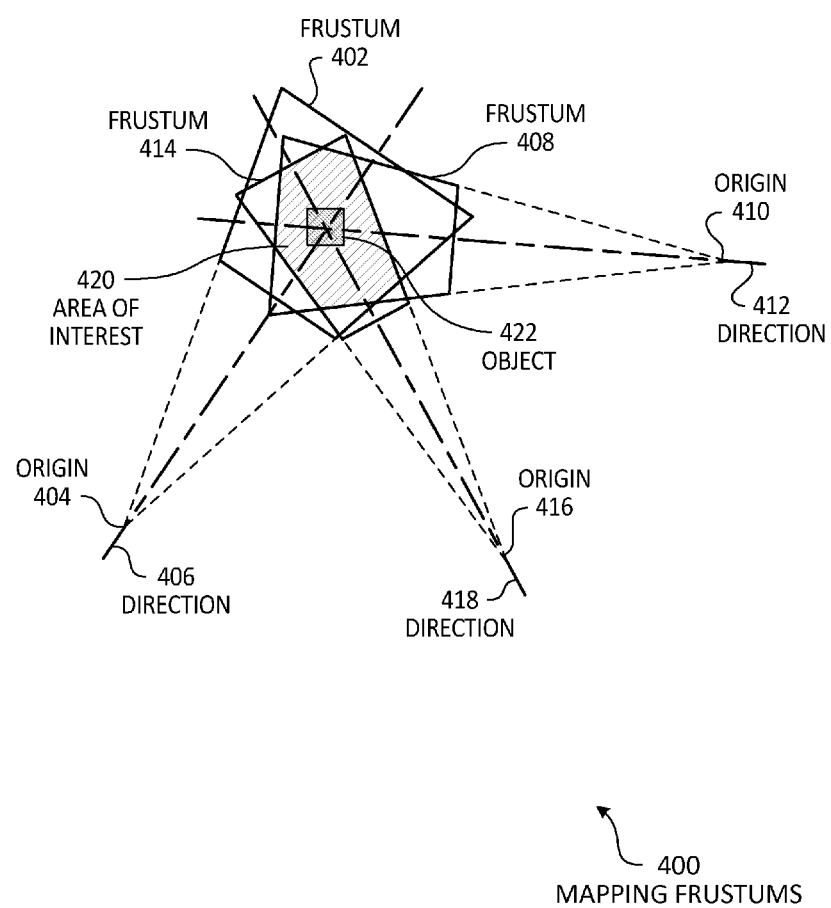
FIG. 4 is a diagram illustration of an embodiment showing a relevance map created by overlapping several frustums.

FIG. 4 is a diagrammatic illustration of an embodiment 400 showing a set of overlapping frustums used for mapping. Three frustums are overlapped to illustrate how an area of interest 420 may be determined. In a practical embodiment, frustums from many more images may be used, but the embodiment 400 is chosen as simplified illustration.

A first frustum 402 is defined by an origin 404 and a direction 406. A second frustum 408 is likewise defined by an origin 410 and direction 412. Similarly, a third frustum 414 is defined by an origin 416 and direction 418.

Each of the frustums 402, 408, and 414 may be defined by applying standard parameters for an image, by determining parameters from a camera when an image is taken, by user input, or by other mechanisms.

The frustums 402, 408, and 414 are placed relative to each other on a coordinate system to create the diagram 400. The area of interest 420 is the area that is overlapped by all three frustums.

An object 422 may be located within the area of interest 420. In embodiment 420, the object 422 is photographed from three different angles and may present three very different visual images at each angle. By overlapping the image frustums in space, the images represented by frustums 402, 408, and 414 may be categorized and grouped together properly even though the object 422 may look very different in each view.

In some cases, a density map may be used to locate areas of interest, and may be termed a relevance map in some instances. The density may be determined by the number of overlapping frustums over a particular area or point. For example, the area of interest 420 has a density of three in embodiment 400. The area of interest 420 is the highest density in embodiment 400 and thus may be selected as the area of interest.

In determining the relevance map of embodiment 400, each frustum may be assigned a value of one. In some embodiments, a frustum may have a density or relevance function that may be applied across the area of the frustum. One example of a relevance function may be to apply a standard distribution curve across the frustum. Another example of a relevance function may be to determine a contrast ratio or other type of evaluation from the image contents. Such a relevance function may be calculated individually for each image.

The relevance function may be used to vary the importance of areas of a frustum when determining a density map or relevance map. In many cases, an image of an object, such as the Eiffel Tower, will have the object centered in the photograph or at least in the center portion of the image. In many cases, an image frustum may have greater importance or significance in the center portion of an image and lesser importance at the edges. Thus, a relevance function may be applied to the frustum in some embodiments to more accurately use data derived from the image, such as the contrast ratio or other computation performed on the image itself, or to use an approximation of a standard distribution.

In some cases, a frustum may have a density value that is greater or lesser than another frustum. For example, images taken with snapshot type camera devices may be given less importance than images taken with high resolution, professional cameras. Images with high resolution or higher contrast may be given more weight than lower resolution or lower contrast, or images taken during daytime may be given more weight than nighttime images. Newer images may be given more weight than older ones, or vice versa.

Figure 5:
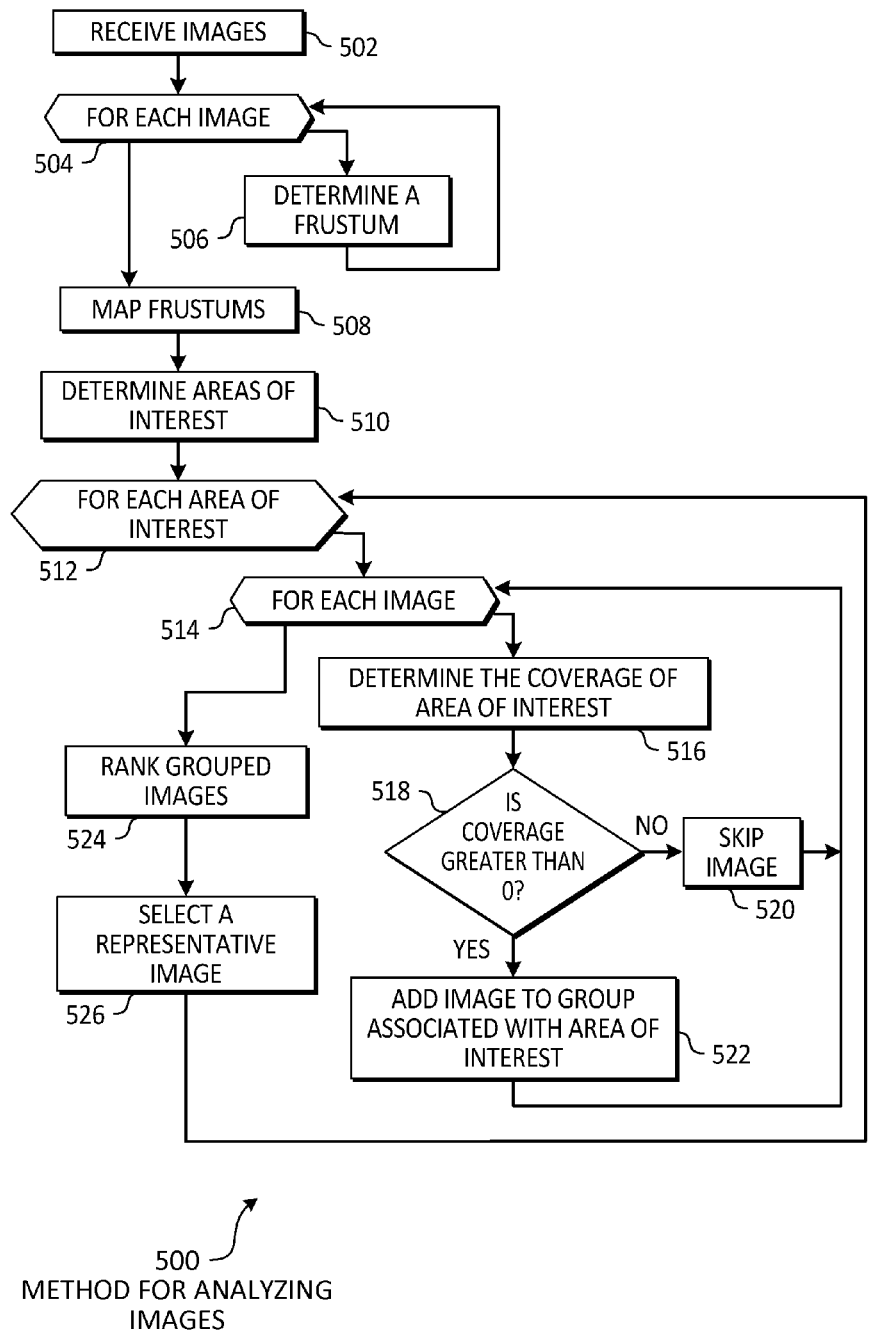
FIG. 5 is a flowchart illustration of an embodiment showing a method for analyzing images.

FIG. 5 is a flowchart illustration of an embodiment 500 showing a method for analyzing images. Embodiment 500 is one method by which a group of images may be analyzed by creating a map from image frustums, determining areas of interest based on the map, and grouping images according to the areas of interest. The images may be ranked within the groups as well.

Images are received in block 502. The images may be any type of images, photographs, video frames, or other captured images. In many cases, the images may be conventional visual images, but images from ultraviolet, infrared, or other image capture devices may also be used.

Figure 6:
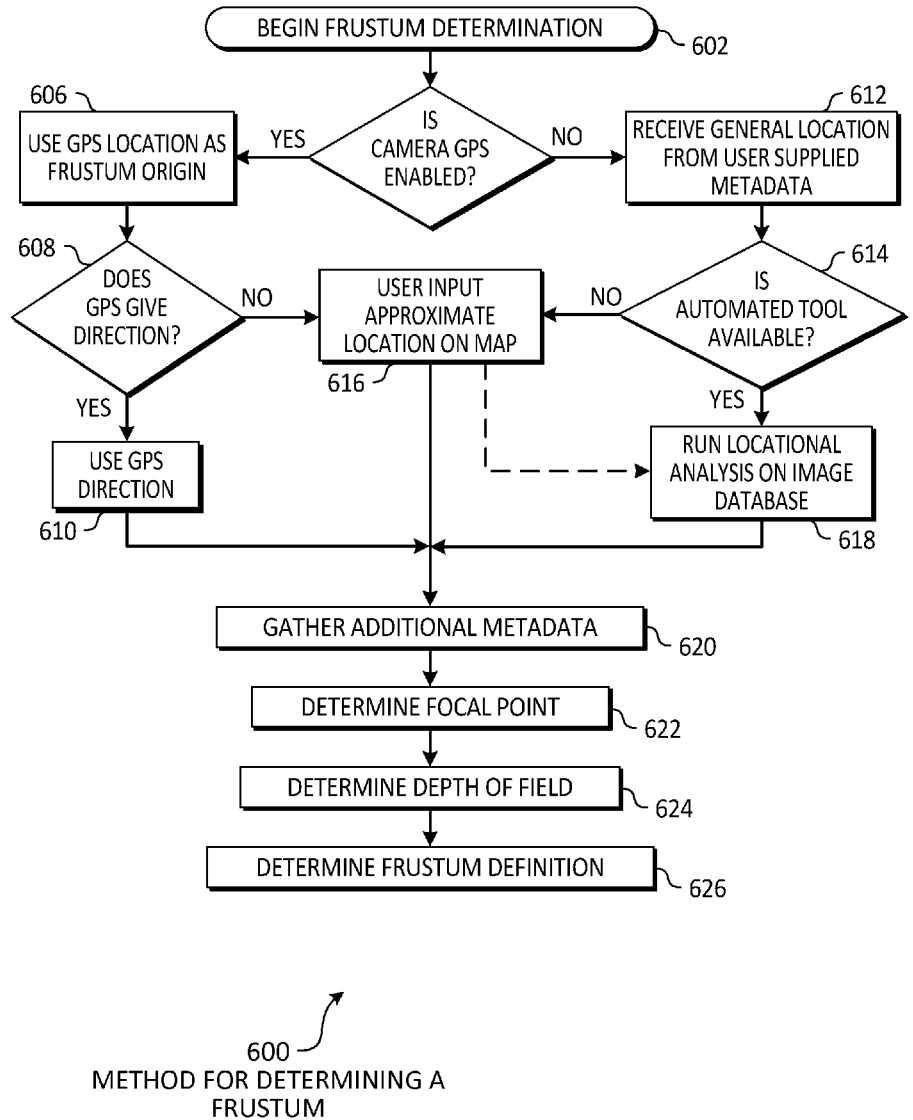
FIG. 6 is a flowchart illustration of an embodiment showing a method for determining frustums.

For each image in block 504, a frustum may be determined in block 506. FIG. 6 included hereinafter will discuss various mechanisms and techniques for determining a frustum for an image.

The frustums are mapped in block 508. In many embodiments, a map may be created by orienting each frustum relative to each other in a geographic representation. In some cases, a two dimensional representation may be used, while in other cases, a three dimensional representation may be used.

Some maps may include a timeline component. Such maps may map the frustums in a two dimensional plane or in three dimensional space, as well as mapping the images in a time dimension.

In many embodiments, frustums may be mapped with a consistent value for each frustum. In some cases, frustums may be weighted due to content that may be derived from the image itself, such as image resolution, sharpness, contrast, or other factors, or frustums may be weighted due to other factors such as image sources, time of day, or other metadata.

Some embodiments may apply a constant value for each frustum, such as applying a designated value for the entire volume or area represented by the frustum. Some embodiments may apply a function across the volume or area represented by the frustum so that some portion of the image may be weighted higher than another.

In such embodiments, a weighting function may be defined for a frustum based on information derived from the image itself, such as determining areas of the image that have more detail than others, or a function may be applied that weights one area of a frustum higher than another, such as a curved distribution across the frustum.

Areas of interest may be determined in block 510 by identifying volumes, areas, or points within the map that have a high or low concentration of frustum coverage. The area of interest may be defined in two dimensional or three dimensional space. In cases where a time element is considered, an area of interest may also include a factor on a time scale.

For each area of interest in block 512, and for each image in block 514, the coverage of the area of interest by the image is determined in block 516. If the coverage is zero in block 518, the image is skipped in block 520. If the image frustum covers at least part of the area of interest in block 518, the image is added to the group of images associated with the area of interest in block 522.

After grouping the images in blocks 514-522, the images may be ranked within the group in block 524. The ranking criteria may be several factors, including degree of image coverage, how well the area of interest is centered within the image, the amount of overlap of the image frustum to the area of interest, image resolution, image sharpness, and other factors.

A representative image may be selected in block 526. In some cases, the highest ranked image may be selected. In other embodiments, a human operator may select a representative image from several of the top ranked images.

FIG. 6 is a flowchart diagram of an embodiment 600 showing a method for determining a frustum. The embodiment 600 illustrates several different techniques that may be used to determine a frustum for an image. The frustum combines geopositional information from one or many sources to determine a size, position, and orientation of a frustum in space.

Frustum determination begins in block 602.

If the camera used to capture an image has a GPS receiver and is GPS enabled in block 604, the GPS location of the camera at the time an image is captured is used as the frustum origin in block 606. If the GPS feature is also capable of giving a direction for the image in block 608, the GPS direction is used for the frustum in block 610.

If the image is captured without GPS information in block 604, the general location of an image may be retrieved from user supplied metadata in block 612. The user supplied metadata may be tags, descriptions, or any other general location information. In block 612, the general location may be non-specific, such as 'Paris, France', or 'around the Eiffel Tower'.

If an automated analysis tool is available in block 614, locational analysis may be run on an image database in block 618. Locational analysis may attempt to map an image to other images to build a two or three dimensional representation of the objects in the image.

In many such techniques, the automated analysis tool may 'stitch' images together by mapping a first portion of a first image with another portion of a second image. When the two images are stitched together, the frustums defining each image may be defined with respect to each other. When enough images are stitched together, a very complete model of the objects in the images can be determined. In many cases, a by-product of such analyses is a very accurate frustum definition for each image.

If no automated tool is available in block 614, a user may input an approximate location on a map for the image in block 616. For example, a user may be shown an interactive map on which the user may select a point and direction where the user was standing with a camera when an image was taken. Other types of user interfaces may be used to capture approximate origin and direction information that may be used to determine an approximate frustum for an image.

Additional metadata concerning an image may be gathered in block 620. Such metadata may include various parameters about the camera when an image was taken, such as f-stop, aperture, zoom, shutter speed, focal length, ISO speed, light meter reading, white balance, auto focus point, or other parameters. Some of the parameters may be used directly in calculating or determining a frustum. Other parameters may be used in later analysis or classification of images. In some cases, a date and time stamp for each image may be also gathered.

Some metadata may be derived from the image itself. For example, resolution, color distribution, color density, or other metadata may be derived and stored.

In the preceding steps, at least an approximate origin and direction may be determined for a frustum. In block 622, a focal point may be determined. In some cases, the focal point may be derived from the various camera settings or from estimating the distance from an image origin to a known landmark. In many cases, a camera's focal point may be infinity or close to infinity for distances greater than 50 or 100 feet.

The depth of field may be determined in block 624. In many cases, the depth of field may be a function of the amount of light, aperture, focus, and other photographic parameters. In cases where the parameters are not known, a standard parameter may be assumed.

The frustum definition may be determined in block 626. In some cases, a very precise frustum may be calculated using GPS inputs and detailed parameters taken from a camera when an image is created. In other cases, a frustum may be a gross approximation based on coarse location and direction information input by a user along with a standardized or generalized frustum size that may be assumed by default.

In many embodiments, the precision of a frustum definition may not adversely affect the resultant relevance map or alter the areas of interest that may be chosen from the relevance map, especially when a very large number of images are processed.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer system having a processor and a memory coupled to the processor, the memory containing instructions, when executed by the processor, causing the processor to perform a method comprising:
   determining a plurality of physical areas in space covered by one or more cameras carried by one or more users, each of the physical areas defined by an approximate point of origin and an approximate direction;
   overlapping the determined plurality of physical areas relative to one another in a geographic representation, the overlapped physical areas having a density of coverage;
   identifying an area of interest based on the density of coverage of the overlapped physical areas; and
   associating one of the users with the area of interest if the camera carried by the user has a physical area that at least partially overlaps the area of interest.

2. The computer system of claim 1 wherein:
   the area of interest is associated with at least one of a structure, an object, or a tourist destination; and
   the method further includes associating one of the users with the at least one of structure, object, or tourist destination if the camera carried by the user has a physical area that at least partially overlaps the area of interest.

3. The computer system of claim 1 wherein:
   the area of interest is associated with at least one of a structure, an object, or a tourist destination;
   the method further includes:
      associating a first one of the users with the at least one of structure, object, or tourist destination if a first camera carried by the first user has a first physical area that at least partially overlaps the area of interest; and
      associating a second one of the users with the at least one of structure, object, or tourist destination if a second camera carried by the second user has a second physical area that at least partially overlaps the area of interest; and
   wherein the first physical area of the first camera at least partially overlaps the second physical area of the second camera.

4. The computer system of claim 1 wherein:
   the area of interest is associated with at least one of a structure, an object, or a tourist destination;
   the method further includes:
      associating a first one of the users with the at least one of structure, object, or tourist destination if a first camera carried by the first user has a first physical area that at least partially overlaps the area of interest, the first camera having a first approximate point of origin and a first approximate direction; and
      associating a second one of the users with the at least one of structure, object, or tourist destination if a second camera carried by the second user has a second physical area that at least partially overlaps the area of interest, the second camera having a second approximate point of origin and a second approximate direction; and
   wherein the first approximate point of origin is different than the second approximate point of origin, and/or the first approximate direction is different than the second approximate direction.

5. The computer system of claim 1 wherein:
   the area of interest is associated with at least one of a structure, an object, or a tourist destination;
   the method further includes:
      associating a first one of the users with the at least one of structure, object, or tourist destination if a first camera carried by the first user has a first physical area that at least partially overlaps the area of interest, the first camera having a first approximate point of origin and a first approximate direction; and
      associating a second one of the users with the at least one of structure, object, or tourist destination if a second camera carried by the second user has a second physical area that at least partially overlaps the area of interest, the second camera having a second approximate point of origin and a second approximate direction; and
   wherein the first physical area of the first camera at least partially overlaps the second physical area of the second camera, and wherein the first approximate point of origin is different than the second approximate point of origin, and/or the first approximate direction is different than the second approximate direction.

6. The computer system of claim 1 wherein identifying the area of interest includes identifying an area on the geographic representation that is most densely covered as the area of interest.

7. The computer system of claim 1 wherein identifying the area of interest includes:
   calculating a distribution of density of coverage on the geographic representation; and
   identifying an area on the geographic representation as the area of interest based on the calculated distribution.

8. The computer system of claim 1 wherein the area of interest is a first area of interest, and wherein identifying the area of interest includes:
   calculating a distribution of density of coverage on the geographic representation; and
   identifying a second area of interest based on the calculated distribution, the second area of interest being different than the first area of interest.

9. A computer-implemented method for identifying an area of interest, the method comprising:
- determining a plurality of frustums individually associated with a field of view of individual cameras, each of the frustums having an approximate point of origin and an approximate direction, wherein the individual frustums represent a geographic coverage area or volume of the corresponding cameras in space;
- arranging the plurality of frustums relative to one another based on the approximate point of origin and the approximate direction in a geographic representation;
- identifying a density of coverage of the plurality of frustums on the geographic representation; and
- determining the area of interest based on the identified density of coverage.

10. The method of claim 9 wherein the cameras are associated with one or more users, and wherein the method further includes:
- determining if one of the cameras has a frustum that at least partially overlaps the determined area of interest on the geographic representation, the camera being associated with one of the users; and
- if the frustum overlaps the determined area of interest, associating the user with the determined area of interest.

11. The method of claim 9 wherein arranging the plurality of frustums includes:
- representing the individual frustums as at least one of a triangle, a truncated triangle, a parallelogram, a ray, or a vector; and
- overlaying the plurality of the at least one of triangle, truncated triangle, parallelogram, ray, or vector on a map.

12. The method of claim 9 wherein arranging the plurality of frustums includes:
- representing the individual frustums as a triangle or a truncated triangle; and
- overlaying the plurality of triangles or truncated triangles on a two-dimensional map.

13. The method of claim 9 wherein arranging the plurality of frustums includes:
- representing the individual frustums as a pyramid; and
- overlaying the plurality of pyramids on a three-dimensional map.

14. The method of claim 9 wherein arranging the plurality of frustums includes:
- arranging the plurality of frustums relative to one another based on the approximate point of origin, the approximate direction, and time in the geographic representation;
- wherein identifying the density of coverage includes identifying a density of coverage with respect to time; and
- wherein the method further includes determining an event based on the identified density of coverage with respect to time.

15. The method of claim 9 wherein determining the area of interest includes determining the area of interest as at least one of a point, an area, or a volume based on the identified density of coverage.

16. A computer system for identifying an area of interest, the computer system comprising:
- means for determining a plurality of physical areas in space covered by one or more cameras, each of the physical areas having an approximate point of origin and an approximate direction, and wherein each of the cameras being associated with a user;
- means for arranging the determined plurality of physical areas relative to one another in a geographic representation, at least some of the physical areas overlap one another;
- means for selecting the area of interest based on the overlapping of at least some of the physical areas;
- means for determining if one of the cameras has a physical area that at least partially overlaps the selected area of interest; and
- means for associating one of the users with the area of interest if the physical area of the camera associated with the user at least partially overlaps the area of interest.

17. The computer system of claim 16 wherein the means for arranging the determined plurality of physical areas includes means for arranging the determined plurality of physical areas as triangles or truncated triangles in a two-dimensional geographic representation.

18. The computer system of claim 16 wherein the means for arranging the determined plurality of physical areas includes means for arranging the determined plurality of physical areas as pyramids in a three-dimensional geographic representation.

19. The computer system of claim 16 wherein the means for selecting the area of interest includes:
- means for calculating a distribution of density of coverage of the physical areas on the geographic representation; and
- means for identifying an area on the geographic representation as the area of interest based on the calculated distribution.

20. The computer system of claim 16 wherein the area of interest is a first area of interest, and wherein the means for selecting the area of interest includes:
- means for calculating a distribution of density of coverage of the physical areas on the geographic representation; and
- means for identifying a second area of interest based on the calculated distribution, the second area of interest being different than the first area of interest.

* * * * *